(12) United States Patent
Dal Canto et al.

(10) Patent No.: US 7,783,701 B2
(45) Date of Patent: *Aug. 24, 2010

(54) SYSTEM AND METHOD FOR PROVISIONING UNIVERSAL STATELESS DIGITAL AND COMPUTING SERVICES

(75) Inventors: Mario Dal Canto, Holmdel, NJ (US); Matthew J. Curtis, Clinton, NJ (US); Gerard E. Dube, Boston, MA (US); Duane Northcutt, Menlo Park, CA (US)

(73) Assignee: SIMtone Corporation, Durham, NC (US)

( * ) Notice: Subject to any disclaimer, the term of this patent is extended or adjusted under 35 U.S.C. 154(b) by 132 days.

This patent is subject to a terminal disclaimer.

(21) Appl. No.: 11/986,118

(22) Filed: Nov. 20, 2007

(65) Prior Publication Data

US 2008/0072298 A1 Mar. 20, 2008

Related U.S. Application Data

(62) Division of application No. 10/328,660, filed on Dec. 23, 2002, now Pat. No. 7,363,363.

(60) Provisional application No. 60/381,532, filed on May 17, 2002.

(51) Int. Cl.
G06F 15/16 (2006.01)
(52) U.S. Cl. .................. 709/203; 709/223; 709/224; 709/225; 709/226; 709/228; 726/4; 726/5
(58) Field of Classification Search ............... 709/200, 709/223, 224, 225, 226, 228, 203; 379/201.04; 726/4, 5
See application file for complete search history.

(56) References Cited

U.S. PATENT DOCUMENTS 5,621,660 A 4/1997 Chaddha et al.

(Continued)

FOREIGN PATENT DOCUMENTS

EP 1 043 656 A2 10/2000

(Continued)

OTHER PUBLICATIONS

CNET Review, GoToMyPC 2.0, www.gotomypc.com/u/tr/cnet?Target=mm/cnetArticle.tmpl*SessionInfo=13709270/A, Jan. 15, 2002.

(Continued)

Primary Examiner—Jinsong Hu
(74) Attorney, Agent, or Firm—Wolf, Greenfield & Sacks, P.C.

(57) ABSTRACT

A service provisioning system and method for providing remote access to digital services over a communications network, comprising a plurality of client devices connected to the communications network for requesting digital services from a plurality of service centers and presenting output from the digital services. The network operation center connected to the communications network authenticates client devices and users, manages sessions, and processes requests for digital services. A connector associated with each service center establishes a session with a client device specified by the network operation center and encapsulates the native protocols of the digital services within a remote interactive protocol. The remote interactive protocol includes information for generating a human-perceptible presentation on the client device, to provide a remote access to the digital services without modifying the hardware and software infrastructure of the service centers.

14 Claims, 4 Drawing Sheets

U.S. PATENT DOCUMENTS

| | | | |
|---|---|---|---|
| 5,623,605 A | 4/1997 | Keshav et al. | |
| 5,768,535 A | 6/1998 | Chaddha et al. | |
| 5,802,178 A | 9/1998 | Holden et al. | |
| 5,896,499 A | 4/1999 | McKelvey | |
| 5,918,051 A | 6/1999 | Savitzky et al. | |
| 6,038,301 A * | 3/2000 | Nightingale | 379/201.04 |
| 6,044,403 A | 3/2000 | Gerszberg et al. | |
| 6,085,247 A | 7/2000 | Parsons, Jr. et al. | |
| 6,104,392 A | 8/2000 | Shaw et al. | |
| 6,154,843 A | 11/2000 | Hart, Jr. et al. | |
| 6,178,438 B1 * | 1/2001 | Tschirhart et al. | 709/200 |
| 6,182,123 B1 | 1/2001 | Filepp et al. | |
| 6,202,156 B1 | 3/2001 | Kalajan | |
| 6,209,031 B1 | 3/2001 | Casey et al. | |
| 6,216,157 B1 | 4/2001 | Vishwanath et al. | |
| 6,223,289 B1 | 4/2001 | Wall et al. | |
| 6,230,296 B1 | 5/2001 | Hanko et al. | |
| 6,233,577 B1 | 5/2001 | Ramasubramani et al. | |
| 6,349,337 B1 | 2/2002 | Parsons, Jr. et al. | |
| 6,362,836 B1 | 3/2002 | Shaw et al. | |
| 6,385,666 B1 | 5/2002 | Thornton et al. | |
| 6,393,605 B1 | 5/2002 | Loomans | |
| 6,425,005 B1 * | 7/2002 | Dugan et al. | 709/223 |
| 6,438,141 B1 | 8/2002 | Hanko et al. | |
| 6,438,617 B1 | 8/2002 | Savitzky et al. | |
| 6,505,248 B1 * | 1/2003 | Casper et al. | 709/224 |
| 6,510,216 B1 * | 1/2003 | Burr et al. | 379/201.12 |
| 6,591,306 B1 | 7/2003 | Redlich | |
| 6,643,701 B1 | 11/2003 | Aziz et al. | |
| 6,711,610 B1 | 3/2004 | Harris | |
| 6,874,088 B1 | 3/2005 | Stevens | |
| 6,917,586 B1 | 7/2005 | Mauger et al. | |
| 6,928,479 B1 | 8/2005 | Meyer et al. | |
| 6,934,706 B1 | 8/2005 | Mancuso et al. | |
| 6,954,792 B2 | 10/2005 | Kang et al. | |
| 6,993,651 B2 | 1/2006 | Wray et al. | |
| 7,003,668 B2 | 2/2006 | Berson et al. | |
| 7,010,608 B2 | 3/2006 | Garg et al. | |
| 7,035,828 B2 | 4/2006 | Ketonen et al. | |
| 7,036,010 B2 | 4/2006 | Wray | |
| 7,092,369 B2 | 8/2006 | Fuccello et al. | |
| 7,103,770 B2 | 9/2006 | Conrath | |
| 7,117,267 B2 | 10/2006 | Bavadekar | |
| 7,130,888 B1 | 10/2006 | Hickman et al. | |
| 7,143,093 B1 | 11/2006 | Bracho et al. | |
| 2001/0042202 A1 | 11/2001 | Horvath et al. | |
| 2001/0047406 A1 | 11/2001 | Araujo et al. | |
| 2002/0032725 A1 | 3/2002 | Araujo et al. | |
| 2002/0046300 A1 | 4/2002 | Hanko et al. | |
| 2002/0049803 A1 | 4/2002 | Bandhole et al. | |
| 2002/0065949 A1 | 5/2002 | Heaton | |
| 2002/0129266 A1 | 9/2002 | Bender | |
| 2002/0133330 A1 | 9/2002 | Loisey et al. | |
| 2002/0133529 A1 | 9/2002 | Schmidt | |
| 2002/0138629 A1 | 9/2002 | Schmidt et al. | |
| 2003/0009568 A1 | 1/2003 | McIntyre | |
| 2003/0028653 A1 | 2/2003 | New, Jr. et al. | |
| 2003/0061301 A1 | 3/2003 | Chethik et al. | |
| 2003/0120747 A1 | 6/2003 | Kim | |

FOREIGN PATENT DOCUMENTS

| | | |
|---|---|---|
| GB | 2 334 646 A | 8/1999 |
| JP | 11-027283 | 1/1999 |
| JP | 2002-007454 A | 1/2002 |
| JP | 2002-041407 A | 2/2002 |
| WO | WO 99/54804 A3 | 10/1999 |
| WO | WO 00/62540 A1 | 10/2000 |
| WO | WO 01/63401 A2 | 8/2001 |
| WO | WO 02/05085 A2 | 1/2002 |
| WO | WO 02/15598 A1 | 2/2002 |
| WO | WO 02/28085 A2 | 4/2002 |
| WO | WO 02/37267 A2 | 5/2002 |

OTHER PUBLICATIONS

Cade Metz, "Remote Control—GoToMyPC," www.gotomync.com/u/tr/pcm?Target=mm/pcmArticle.tmpl&SessionInfo=13709270, Jul. 1, 2002.

Translation of Office Action dated Feb. 28, 2008, in corresponding Japanese Patent Application No. 2004-508026.

* cited by examiner

SYSTEM AND METHOD FOR PROVISIONING UNIVERSAL STATELESS DIGITAL AND COMPUTING SERVICES

RELATED APPLICATIONS

This application is a divisional of U.S. application Ser. No. 10/328,660, entitled "SYSTEM AND METHOD FOR PROVISIONING UNIVERSAL STATELESS DIGITAL AND COMPUTING SERVICES," filed on Dec. 23, 2002, which claims priority under 35 U.S.C. §119(e) to U.S. Provisional Application Ser. No. 60/381,532, entitled "SOFTWARE AND SERVICE PROVISIONING ARCHITECTURE FOR UNIVERSAL STATELESS DELIVERY OF ANY DIGITAL AND COMPUTING SERVICES," filed on May 17, 2002, each of which is herein incorporated by reference in its entirety. This divisional contains non-elected claims from a Restriction Requirement mailed on Aug. 29, 2006.

BACKGROUND OF INVENTION

The present invention relates generally to remote access of digital data and services and, more particularly to a service provisioning system architecture for providing universal stateless digital and computer services.

The configuration of corporate computer systems has evolved over the past fifty years since the introduction of the software programmable digital computer. In the first multi-user systems, some number of users, such as corporate employees, etc., accessed the processing power of one or more centrally located mainframe computers using "dumb terminals" connected to the mainframe computers via a communications network. The mainframe computers provided all processing power and data storage facilities. The dumb terminal was used for and limited to inputting data to the mainframe computers and displaying output data generated by the mainframe computers. That is, the dumb terminal did not have the capability of processing or storing data locally. Essentially, the dumb terminal was useless unless it was connected to the mainframe computers via a dedicated, mainframe and installation-specific communications network.

However, the high cost associated with acquiring and maintaining the mainframe computers fueled the availability and popularity of the desktop or personal computer ("PC") in the 1980s. Initially configured as a stand-alone platform, a PC is a self contained computing system where all processing is performed locally, and all applications and data are executed and stored locally. The relatively low cost of PCs enabled single users and small businesses to readily acquire and utilize the processing power of the PCs instead of relying on massive, centrally located mainframe systems. However, users could not easily share data with other users since their PCs were not part of a centralized network and did not necessarily use the same operating system. Also, since each PC needed its own local copy of any software to be executed, incompatible versions of the same software application in different personal computers prevented users from communicating and sharing data with each other.

These connectivity and compatibility problems with the standalone PCs gave rise to client/server systems. The PCs (or clients) were connected to each other via a private communications network, such as a corporate network, and to a common server storing data and applications. The server maintains the common data and provides copies of the data to the clients upon request. However, since the client/server systems rely on the processing power of the PC, the hardware and software components of each PC of a client/server network must be constantly synchronized and therefore upgraded. In many corporate settings, PCs are numerous and widely distributed throughout and among diverse locations. Depending on the age and type of the PC system, certain hardware components, such as microprocessors, random access memory (RAM), hard disk devices, etc., can be upgraded or replaced without replacing the entire PC system. However, even when it is feasible to upgrade the PC systems, the cost of upgrading thousands of PC systems can be staggering.

When the PC system can no longer be upgraded, the entire system must be replaced. For example, newer versions of software applications or operating systems may require hardware capabilities that cannot be satisfied by existing PC systems. Generally, a PC system is considered to be obsolete in three to five years, thereby necessitating costly replacement of thousands of PCs as often as every three years.

In addition to the cost of purchasing new hardware and software, the cost of resolving the software and hardware compatibility problems in the client/server system can be substantial. For example, many software applications are not readily backwards compatible, thereby imposing a significant burden on the corporations to maintain compatible versions of software applications on all PC systems. The administrative effort and the cost to upgrade each system, provide licensed copies of software, install and maintain the software is the largest portion of the recurring costs of running a client/server network in a corporation. Even with remote administration capabilities, the tracking and cataloging of software applications can be very onerous.

Installation of new software also exposes the corporate user to security risks. The integrity and security of the corporate network can be easily breached by hackers or disrupted partially or in total by inadvertent or intentional introduction of computer viruses when a user installs or downloads unauthorized and even authorized software application or files.

Individuals who are away from their office often have a continuing need to gain access to their corporate networks. They may need to access files, e-mails, applications and programs running on their "desktop", etc. ("Desktop" refers to a top level, local graphical user interface environment customized by a user to display and provide access to data, folders and applications.) One approach is to use laptop personal computers to enable users to access the corporate network to remotely access their files and e-mails. That is, if appropriate communications software is installed on each client laptop PC, the users can remotely access emails and the corporate network to transfer files from/to the network server through a dial-up telephone line (or a broadband connection, such as a digital subscriber line (DSL), T1, cable, etc.). All application programs reside and locally execute on the local client laptop PC. While this approach is simple, it necessitates that each and every such software application be installed, configured and then maintained on each laptop PC. Consequently, over time, this approach, particularly in view of the on-going support costs of the installed software applications, can become quite expensive.

Another approach uses a traditional virtual private network (VPN) to provide wide area network (WAN) connectivity from a remote user location to a central corporate local area network (LAN). A VPN WAN connection can implement an Open System Interconnection (OS) layer 2 extension between the LAN and the remote user location. A remote client PC connected through a VPN to a LAN appears as if it is directly connected to the LAN. However, a VPN connection requires expensive VPN termination equipment (or a client-site VPN router) located at each end of the connection, or VPN client software installed and configured at the client machine. In either case, the VPN terminator provides layer 2 packet processing as well as appropriate packet encryption/decryption functionality. Although either PC operating system or client based VPN software can mitigate the cost of the VPN terminator, it both requires considerable packet processing to assemble and disassemble packets, imposing a significant processing burden on the PC. Accordingly, a separate dedicated VPN terminator at the remote user location is often required to support VPN connectivity with required levels of security and reliability without imposing undue processing loads on the client PC itself. Thus VPN equipment is not only expensive, but tedious to configure and costly to administer and maintain.

In all of the above cases, sensitive corporate data are transferred and duplicated between the secure corporate network and the PC/laptop. Once data is downloaded and physically copied, no access or transport security system can prevent unauthorized, uncontrolled distribution and misuse of the data, which happens without the knowledge of the legitimate data owner.

Still another approach to extending the office environment to remote user locations utilizes an application service provider (ASP) model requiring the installation of specialized server software in the network server, such as Citrix Corporation's MetaFrame® software using independent computing architecture (ICA®) protocol. The network server situated on the LAN would function as an ASP by hosting multiple virtual machines, to various different remotely located client PCs. Alternatively, Microsoft Corporation's Windows® Terminal Services (WTS) using remote desktop protocol (RDP) can be utilized to provide multiple virtual machines. However, both the MetaFrame® and WTS software impose considerable processing load on the client PC, and are vulnerable to network faults and security breaches, such as "man-in-the-middle" attacks. Additionally, the ASP-based approach, at best, provides a limited remote execution functionality. The prior art systems were designed and developed to overcome the bandwidth limitations of the prior communications networks. Current technological advances have dramatically increased the bandwidth of the communications network. The network bandwidth is increasing faster than microprocessor speed and doubling approximately every nine months, thereby reducing the value of the prior art systems and technologies, effectively rendering them obsolete. In view of the shortcomings of the prior systems and networks, it is desirable to provide a system and method for enabling a user to securely access his client machine, including desktop, software applications, email, data files, etc., from anywhere in the world as if he is still in the office without compromising security or investing in new hardware/software infrastructure.

Managing information systems efficiently has never been more difficult or more essential for success. As the cost of ownership for desktop systems escalates, corporations need ways to reduce purchase and upgrade costs, administration and maintenance expenses. However, these savings can't result in a loss of functionality or performance. An unrestricted access to high performance applications remains a critical requirement in managing information systems efficiently. Thus, it is desirable to have a service provisioning system architecture that can provide an unrestricted, native and secure remote access without modifying or with minimal changes to its existing hardware and software infrastructure.

SUMMARY OF INVENTION

Therefore, it is an object of the present invention to provide a service provisioning system architecture that delivers universal stateless digital and computing services and overcomes the above-noted shortcomings.

It is another object of the present invention to provide a service provisioning system architecture that provides a secure, reliable, rich, high-performance access to corporate system, such as legacy enterprise data center, with no or minimal modification to the existing hardware and software infrastructure. The corporate data center can be outfitted with a connector or connection service device to provide a secure remote access from anywhere in the world.

The inventive system and method enables a user of a client device, preferably a stateless client device, to access remote resources including applications and data. Thus, without requiring a local copy of software or data or corresponding hardware resources, a user can surf the Internet, and access his desktop operating system, files and applications. The user can further access other digital services, such as digital video and music broadcasts, Internet protocol (IP) telephony and the like, using a client device much like a television. Preferably, the system includes an authentication system or mechanism, such as a smart card.

By defining a new way of delivering digital services, the inventive service provisioning system architecture offers multiple levels of functionality, security and long-term investment protection at a significantly lower overall cost than prior approaches, and allows delivery of any digital service to a remote location without requiring a local copy of the data, any application or supportive hardware.

In accordance with an embodiment of the present invention, the inventive system delivers digital services from an existing network, system or data center through a single "Digital Dial Tone" network without compromising security or modifying any of the functions, operations and hardware/software infrastructure or the existing network. The service provisioning system architecture of the present invention connects simple, low cost, low maintenance client devices, that can be incorporated in various forms, such as desktops, portable, wireless, or embedded in existing legacy appliances such as TVs, PDAs and PCs.

In accordance with an embodiment of the present invention, the service provisioning system provides remote access to digital services over a communications network, comprising a plurality of client devices connected to the communications network for requesting digital services from a plurality of service centers and presenting output from the digital services. The network operation center connected to the communications network authenticates client devices and users, manages sessions, and processes requests for digital services. A connector associated with each service center establishes a session with a client device specified by the network operation center and encapsulates the native protocols of the digital services within a remote interactive protocol. The remote interactive protocol includes information for generating a human-perceptible presentation on the client device, to provide a remote access to the digital services without modifying the hardware and software infrastructure of the service centers.

In accordance with an embodiment of the present invention, the service provisioning method provides a secure remote access to digital services over a communications network. The method connects each service center to a connector to provide one or more digital services over the communications network, the connector encapsulating respective native protocols of the digital services within a common remote interactive protocol. The method receives a request for a digital service available on a service center from a user on a client device over the communications network. The network operation center authenticates the user and the client device. If the user and the client device are authenticated as a valid user and a valid client device, a device connection to the client device is established to initiate a session. The method translates input/output commands of the requested digital service into the remote interactive protocol by the connector, thereby making the requested digital service on the service center remotely accessible to the valid user on the valid client device without modifying the hardware and software infrastructure of the data center.

The present invention may be embodied in a network of computer systems including a set of dedicated servers adapted by a set of software components, all configured according to the service provisioning system architecture. This architecture has the ability to connect, generate, manage and deliver a digital service session to a variety of client devices connected to the network, and enables the "hot swapping" or "switching" of such sessions between devices by simply authenticating the user through a smart card or other applicable access control technology. By reason of the unique and novel aspects of the present invention, user interaction with each service is unaffected by the type, location or connectivity of the device used.

Various other objects, advantages and features of this invention will become readily apparent from the ensuing detailed description and the appended claim.

BRIEF DESCRIPTION OF DRAWINGS

The following detailed description, given by way of example, and not intended to limit the present invention solely thereto, will best be understood in conjunction with the accompanying drawings in which.

DETAILED DESCRIPTION

The present invention is readily implemented using presently available communication apparatuses and electronic components. The invention finds ready application in virtually all communications systems, including but not limited to intranet, local area network (LAN), wireless LAN (WLAN), wide area network (WAN), Internet, private and public communications networks, wireless, satellite, cable network or other online global broadcast, point-to-point, and other networks.

The present invention provides the basis for a secure, reliable, rich, high-performance access to a wide variety of computational, communications, entertainment and other digital services (collectively referred to herein as "digital services") while providing enhanced security and without requiring a costly conversion to a new hardware/software infrastructure. The system utilizes low-cost, low-maintenance devices to deliver digital services over a wide variety of communications networks worldwide. The inventive service provisioning system architecture is operable to manage multiple user sessions from a variety of different client devices. The system continuously maintains each session, thereby permitting the user to readily access his session from different locations and client devices.

Figure 1:
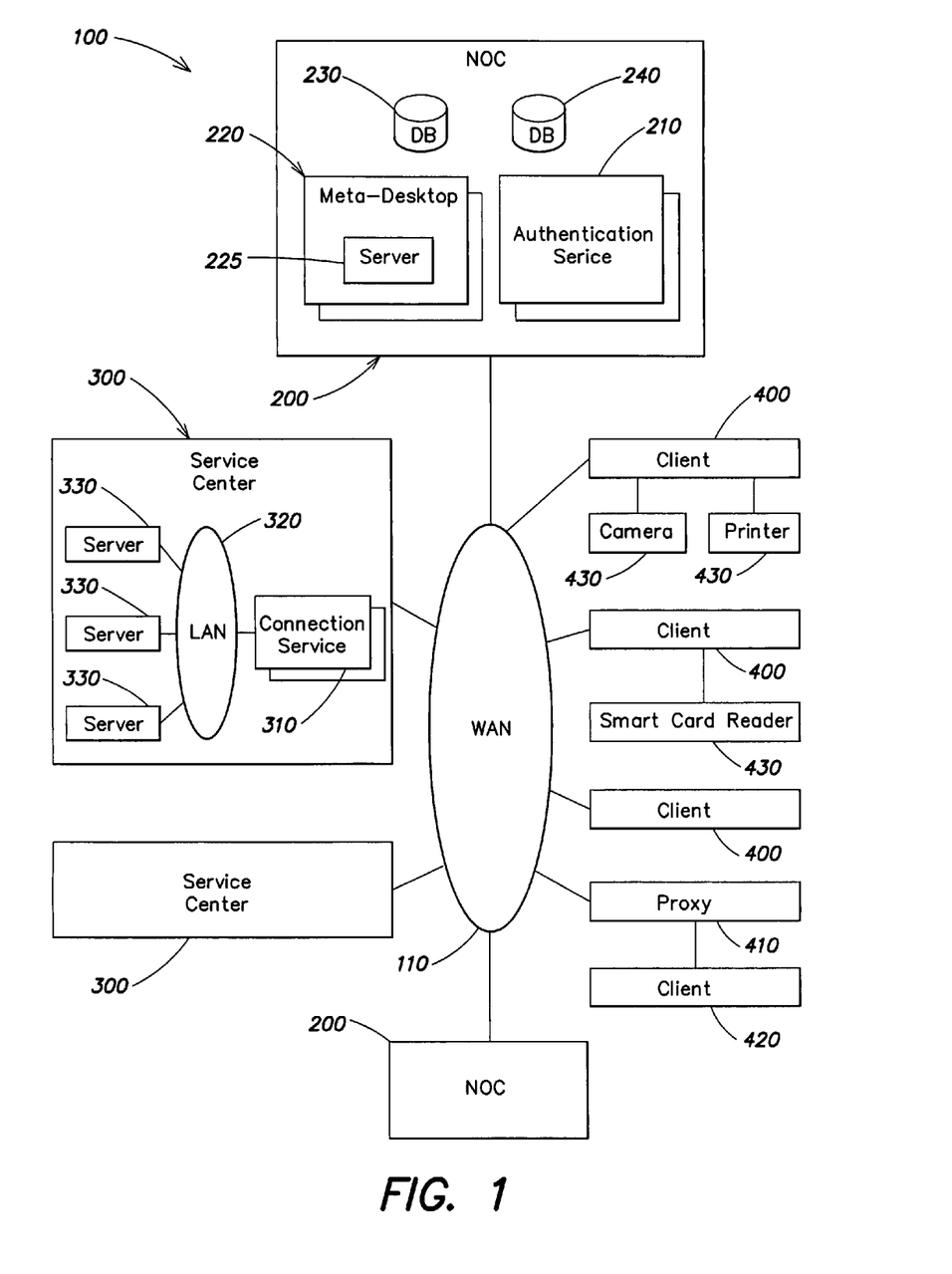
FIG. 1 is an exemplary block diagram of the service provisioning system architecture of the present invention.

In accordance with an embodiment of the present invention, as shown in FIG. 1, a service provisioning system architecture 100 comprises one or more client devices 400, service centers 300 and network operation centers (NOC) 200 connected to each other via a communications network, such as the Internet or a wide area network (WAN) 110. The service provisioning system architecture 100 can utilize virtually any communications system, such as intranet, local area network (LAN), wireless network including wireless LAN (WLAN), wide area network (WAN), Internet, private or public communications network, satellite network, cable network, other online global broadcast network and the like. In accordance with an aspect of the present invention, the service provisioning system architecture 100 includes security tokens associated with each authorized user of the universal stateless digital and computing services.

In accordance with an embodiment of the present invention, the WAN 110 is a packet network using, for example, transmission control protocol/Internet protocol (TCP/IP). Since all processing and computations are centrally performed at the service center(s) 300, the WAN 110 should support a desired level of quality of service (QOS) to insure timely response time and timely delivery of data between the client devices 400 and the service centers 300. For example, in order to ensure that the user does not experience an unacceptable or even noticeable delay, the round-trip delay imposed by the WAN 110 should be less than, for example, 60 msec. Accordingly, the total time from user entering the inputs to the rendering of the textual or graphical representation of the result (i.e., round-trip delay) should be below the user's threshold of perception, i.e., about a hundred milliseconds. Preferably, the QOS demands on the WAN 110 as characterized by round-trip delays are less than 60 ms on average and less than 100 ms in the worst case. It is appreciated that from user standpoint and perception, a higher average delay with a low variance is generally preferred over a lower average delay with a high variance.

Consistent with current and foreseen architecture of global communications networks, the bandwidth requirements of WAN 110 are highly asymmetrical for typical computing applications. The remote processing and rendering aspect of the inventive service provisioning system architecture 100 typically generates considerably more downstream traffic (i.e., data traffic from the service center 300 to the client device 400) than upstream traffic (i.e., data traffic from the client device 400 to the service center 300). In typical application, the bandwidth demand from upstream traffic is on the order of a few kilobits per second (Kbps) whereas the downstream traffic averages between a few hundred Kbps to several Mbps. For example, in a digital broadcast service application, the traffic consists mainly of broadcast video/audio data from the service center 300 to the client device 400 (i.e., downstream traffic) at 1.554 Mbps after the user selects a particular broadcast or channel similar to the over-the-air broadcast television and cable television, the latter requiring a single upstream transmission of less than one kilobyte.

Remote devices 430, e.g., CD-ROMs, video cameras, scanners, printers, etc., connected to the client devices 400 can increase the upstream traffic to impose additional bandwidth requirements on the WAN 110. However, these upstream bandwidth demands on WAN 110 can be easily quantified and tend to be constant, frequently being isochronous.

In accordance with an embodiment of the present invention, the inventive service provisioning system architecture 100 utilizes industry standard compression technology to transmit audio and/or video content (e.g., Moving Picture Experts Group (MPEG), MP3 and the like). Accordingly, bandwidth demands on the WAN 110 from multimedia and telephony applications can be defined. The availability of enhanced WAN performance, e.g., a higher WAN QOS guarantee, may reduce the cost of client devices 400 due to lower memory and data buffering requirements. For example, the approximate bandwidth requirements for various multimedia applications on the WAN 110 include: 160 Mbps for uncompressed analog National Television Standards Committee (NTSC) video and audio, 2 to 7 Mbps for compressed DVD-quality video, 384 Kbps to 1 Mbps for VCR-quality video using the latest coder/decoder (codec), 1.5 Mbps for raw (e.g., pulse width modulation (PWM) encoded) CD-quality audio and 128 Kbps for MP3-compressed music. In contrast, the bandwidth requirement can be as little as 8 Kbps for simple telephony grade compressed audio.

In accordance with an embodiment of the present invention, the inventive service provisioning system architecture 100 can use various public and/or proprietary remote interactive protocols to ensure user authentication and privacy, preferably through end-to-end encryption. For example, the present system can utilize protocols such as remote desktop protocol (RDP), independent computing architecture (ICA®), hypertext transfer protocol (HTTP), stateless low-level interface machine (SLIM), appliance link protocol (ALP), etc., as the remote interactive protocol as long as the protocol provides user authentication and enables the user to securely connect and disconnect to/from the session. WAN 110 preferably comprises a virtual private network (VPN) service to segregate data traffic and to provide a high level of network performance.

Various digital services available from the service centers 300 can be accessed by the users using the client devices 400. The client devices 400 can be located in corporate offices, homes, hotels, airplanes, cars, other in-transit or franchised commercial spaces and the like. The inventive service provisioning system architecture 100 of the present invention contemplates users employing a variety of different client device implementations and a variety of different type of client devices to access the digital services available from and supported by service centers 300. These client device implementations can range from a hardware-intensive solution, such as a stateless device (for example, a video display terminal), to a software based solution wherein terminal emulation software is installed on a standard PC (i.e., a stateful device) to emulate a client device 400. The client devices 400 can range from simple "Walkman®-like" personal audio playback devices to full-function "PC-like" devices that are comparable to high-end workstations in both functionality and performance. Accordingly, client devices 400 may include but are not limited to kiosks, "dumb" terminals, personal digital assistants (PDAs), laptop computers, desktop PCs, network PCs, wireless handheld PCs, smart telephones, set top boxes (STB), TV sets, and the like.

In accordance with an embodiment of the present invention, client devices 400 can comprise various input/output peripheral equipment, e.g., displays, keyboards, speakers, microphones, smart card readers, etc., each connected to WAN 110. Preferably, client device 400 implements a remote interactive protocol (or a subset of a remote interactive protocol, i.e., "light" or "mini" version of the protocol) to communicate with the NOC(s) 200 and service center(s) 300 on the WAN 110. Client devices 400 can each comprise a combination of the defined peripheral devices, such as one or more display devices (e.g., full-color, black/white, LCD, direct-mapped, frame-buffer device, etc.), input devices (e.g., mouse, keyboard, touch-screen, scanner, card reader, buttons, etc.), audio devices (e.g., speaker, microphone, etc.), video devices (e.g., camera, codec, clip/overlay region, etc.), and storage devices (e.g., universal serial bus (USB) devices such as printers, CDROMs, DVDs, hard disks, etc.). The specific instances and/or the number of each class of peripheral devices associated with a particular client device 400 are enumerated at power up and reported to the NOC(s) 200 as part of the device authentication and connection setup process. In this manner, the service centers 300 can adapt their input/output (I/O) interfaces to support the capabilities of a specific client device 400 configuration that is currently being used to support a number of different types of client devices 400. For example, in the case of bus-connected peripherals such as USB devices, all "plug" events (i.e., connect/disconnect events) are signaled or reported to NOC(s) 200 via the remote interactive protocol so that appropriate action can be taken at the service center(s) 300 to communicate with the client devices 400. Such actions may include, for example, transmitting appropriate rendering commands to client device 400. The signaling is also necessary because device drivers associated with the attached bus-based peripherals reside and execute on the service centers 300 and not on client devices 400. In accordance with an embodiment of the present invention, the client device 400 encapsulates or wraps the native protocol of the attached peripheral device (i.e., native USB protocol) within an appropriate remote interactive protocol and passes the native commands between the attached peripheral and corresponding service center 300, i.e., the one currently in communication with and providing service to the client device 400. In accordance with an embodiment of the present invention, the remote interactive protocol overlays or operates "on top" of the existing native protocol to thereby enable any device to connect and communicate with the service provisioning system architecture 100. The actual policy defining the operation of the attached peripheral device is set by the corresponding service center 300. For example, the responsible service center 300 determines how to interact with, i.e., "what to do" with the attached peripherals and how to respond to various events such as hot plug/unplug, device-specific exceptions, etc.

In accordance with an embodiment of the present invention, a proxy device 410 can be utilized to enable a non-compliant client device 420 to connect to the WAN 110 and communicate with the service centers 300 and the NOC 200. Non-compliant client devices 420 may represent devices that do not currently itself support the remote interactive protocol of the service provisioning system architecture 100. To provide appropriate interface, the proxy device 410 appears to the WAN 110 as a client device 400 and acts as a protocol converter or "tunnel device" for the non-compliant client device 420. For example, instead of installing the emulating software on a "dumb" terminal, the "dumb" terminal can be connected to a proxy device 410 which is connected to the WAN 110, thereby enabling the "dumb" terminal to communicate with the NOCs 200 and the service centers 300 via the proxy device 410 and WAN 110.

For example, the proxy device 410 can be used to connect a non-complaint thin client to the WAN 110 by converting the thin client's native protocol to its analog in the remote interactive protocol. Accordingly, from the service provisioning system architecture's point of view, the non-compliant thin client is just another client device 400 connected to the WAN 110. Whereas, from the thin client's point of view, it is simply connected to a standard thin client server. Therefore, the service provisioning system architecture 100 can connect and communicate with existing network, device or system with no or only minimal modification to the hardware and/or software infrastructure of the existing network, device or system. Accordingly, the existing network, device or system's functions, operations and infrastructure have not changed, but its capabilities have been enhanced and extended by connecting to the service provisioning system architecture 100. By connecting to the service provisioning system architecture 100, a corporation, an organization or an individual can now provide a world-wide remote access to the services available on its existing network, device or system without compromising security or investing in new hardware/software infrastructure, such as new client-server system, firewalls, etc.

In service provisioning system architecture 100, the "real" computing resources and the data associated with the services reside in the service centers 300. It is appreciated that a service center 300 can be a legacy enterprise data center outfitted with one or more connectors or connection service modules 310, or a special site set up specifically to support a given service, such as video conference, Internet protocol (IP) telephony, voice messaging, cable television, digital music, digital movie, e-commerce, etc. The service provisioning system architecture 100 enables the service provider to offer its services by establishing a service center 300 which connects its system to the WAN 110 via a connector 310. The connector or connection service module 310 encapsulates or wraps the existing native protocol of the corresponding service center 300 within an appropriate remote interactive protocol. This enables the service center 300 to transmit its native commands to client devices 400. Also, connector or connection service module 310 of the service center 300 unwraps or disassembles the remote interactive protocol messages or packets containing the native commands of the client devices 400 destined for service center 300. In accordance with an embodiment of the present invention, all services offered by the service centers 300 are delivered to the client devices 400 at the direction of, and under the continuous control of, the NOC(s) 200, described hereinbelow.

In accordance with an embodiment of the present invention, service provisioning system architecture 100 enables a service provider to convert a data center into or establish a service center 300 with no or only minimal changes to its existing hardware and software infrastructure. For example, a corporation can seamlessly convert its legacy enterprise infrastructure into a service center 300 and connect the service center 300 to WAN 110 via a connector 310 to provide its employees a secure remote access to a portion or all of the services available on its legacy enterprise infrastructure. The remote interactive protocol of the service provisioning system architecture 100 operates "on top" of the native protocol of the legacy enterprise system to provide a secure remote access to authorized employees. For Unix-based servers, remote access to applications can be provided by either "xhost'ing" the applications or running a special "virtual framebuffer" driver in the server's X11 server software. For Microsoft Windows®-based servers, remote access to applications can be provided by enabling the windows terminal server function and using Microsoft's RDP protocol. Both of these methods provide remote access to applications that run on the servers within the service center 300. In either case, the service center 200 has one or more connection service modules 310 that are connected to the LAN 320 (or the enterprise's Intranet) on one side and to the WAN 110 on the other side. Alternatively, the connector or connection service module 310 can be connected to the WAN 110 via a firewall device (not shown). The connection service module or connector 310 maintains a secure connection to one or more NOCs 200, and awaits instructions to securely connect one of its offered services to a client device 400 specified by one of the NOCs 200. Accordingly, everything that was previously available directly from the data center (e.g., user applications, e-mail clients, voice processing, internet connections, etc.) is now remotely accessible by a remote user, preferably using a smart card (described hereinbelow) from anywhere, yet, the data never exits the perimeter of the service center 300. Hence, there is no need for a laptop or proprietary personal digital assistants (PDAs), while traveling, although they can still be used. With the service provisioning system architecture 100, businesses and corporations no longer need to purchase and maintain desktop or laptops, provide technical and software support at the individual client device location, thereby saving substantial cost, time and overhead while providing an unprecedented level of security and performance.

In accordance with an embodiment of the present invention, connection service module 310 comprises software and hardware components, such as a set of one or more low cost, horizontally scalable servers 315 that connect each digital service to the WAN 110. For example, the digital service can represent computers or servers running a specific operating system (i.e., Windows®, Macintosh™, Linux™, Unix™, Solaris™, etc.), digital television broadcasts, IP telephony and the like. Connection service module 310 act as the local user interface for each service, interpret the display/sound and user command set for each service and convert the command set to and from the remote interactive protocol format. Once a session is established between a client device and a service center 300, connection service module 310 uses the client device 400 to receive and display the human perceptible output of a subscribed or requested digital service and transmit basic, atomic inputs to the subscribed or requested digital service. Connection service module 310 or servers 315 collect the video or display image (i.e., pixels), sound and I/O data sets of a digital service and generates a stateless session with the client device 400. Servers 315 are "appliance-like" in nature, requiring minimal maintenance and performing only a single function. That is, the servers 315 only manage device connections between applications or services running on the servers 330 within the service center 300 and the client devices 400 requesting such service.

The network operations center (NOC) 200 is the gateway to all of the services offered by various service centers 200 connected to the WAN 110. The NOC 200 authenticates all connection requests received from the client devices 400 and securely transfers the connection to the appropriate service center 300 to deliver the requested services to the client devices 400. Accordingly, the service provisioning system architecture can support multiple NOCs 200 to support a large number of client devices. In accordance with an embodiment of the present invention, the number of NOCs 200 is not only vertically scalable, but the functions within a single NOC are also horizontally scalable (number of hardware/software components within the NOC 200 can be increased to expand the NOC's capabilities).

Figure 3:
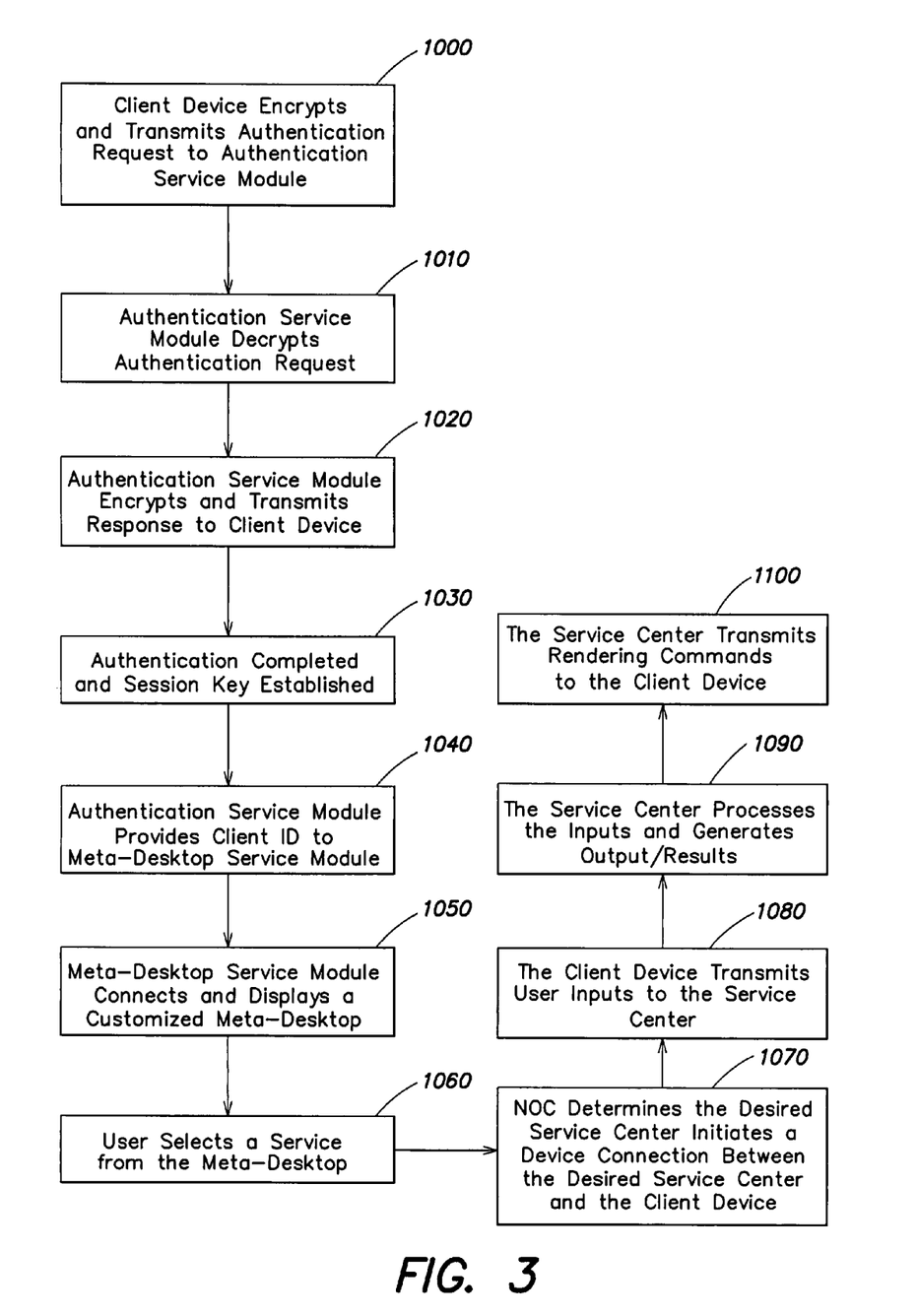
FIG. 3 is a flow chart of an authentication process in accordance with an embodiment of the present invention.

In accordance with an embodiment of the present invention, the NOC 200 comprises one or more authentication service modules 210, a Meta-Desktop™ service module 220, a user database 230 and a client database 240. The authentication service module 210 responds to authentication requests from the client devices 400 and executes the authentication process of the remote interactive protocol to setup and maintain valid authenticated connections between the client devices 400 and the NOC 200. The authentication service module 210 stores and maintains valid client devices, user IDs and their associated public keys in the user database 230 and the client database 240. Each client device 400 can be associated with a particular NOC 200. Alternatively, each client device 400 can be associated with a primary NOC 200 and a secondary NOC 200 in case the primary NOC 200 is unavailable. Turning now to FIG. 3, there is illustrated an authentication process in accordance with an embodiment of the present invention. The client device 400 can either transmit its authentication request directly to the assigned NOC 200 (i.e., www.xds.net, www.xds.co.jp, www.xds.de, etc.) or broadcast its authentication requests on the WAN 110 to be received and processed by the assigned NOC 200 in step 1000. Preferably, the client device 400 uses the public key associated with the assigned NOC 200 to encrypt the authentication request before transmitting or broadcasting its authentication request to the assigned NOC 200 in step 1000.

Each NOC 200 is assigned a unique private key. Using the NOC's private key, the authentication service module 210 decrypts the authentication requests or messages received from the client devices 400 in step 1010. The authentication service module 210 transmits or broadcasts an encrypted response to a particular client device 400 by encrypting the response using the public key that is associated with that client device 400 or a user on that client device 400 in step 1020. Preferably, the inventive service provisioning system architecture 100 employs symmetric public key exchange wherein the authentication service module 210 has the public key associated with a user or the client device 400 and the client device 400 has the public key associated with the authentication service module 210. That is, the client device 400 encrypts its authentication requests using the public key that is associated with the assigned NOC 200 and decrypts the response or messages received from the assigned NOC 200 using its or user's private key. This symmetric authentication procedure ensures that valid NOC 200 is in communication with a valid client device 400.

Once the authentication request and response have been successfully exchanged between the requesting client device 400 and the authentication service module 210, the requesting client device 400 and the authentication service module 210 share a unique value (preferably, a value that is difficult to determine or guess) that can be used as a session key or initial session key in step 1030. In accordance with an embodiment of the present invention, each client device 400 includes a smart card reader 430. Each smart card uniquely identifies a user and stores user information, such as user ID, user's private key, NOC's public key and the like. A user inserts his smart card into the smart card reader 430 of the client device 400 to initiate a session between the client device 400 and a NOC 200. The smart card generates an authentication request based on the client ID of the client device 400 and encrypts its authentication request using its stored public key and decrypts the response or messages received from the NOC 200 using its stored private key. Once the authentication request and response have been successfully exchanged, the smart card and the authentication service module 210 now share a session key or initial session key to establish a session with each other. The use of the smart card enables a NOC 200 and a thin or "dumb" client device 400 (i.e., a low cost client device lacking encryption and decryption capabilities) to authenticate each other to establish a session.

Once the session key and the authentication of the requesting client 400 has been established, the authentication service module 210 passes off or provides the client ID associated with the requesting client device 400 to the Meta-Desktop service module 220 in step 1040. The Meta-Desktop service module 220 establishes a device connection with the requesting client device 400 and displays a customized Meta-Desktop on the requesting device 400 in step 1050.

In accordance with an embodiment of the present invention, the Meta-Desktop module 220 comprises one or more Meta-Desktop servers 225. The Meta-Desktop service module 220 searches the client database 240 for a client profile based on the client ID supplied by a remote user's smart card and reads or retrieves the client profile to determine the client device type, the location of the client device (e.g., geographic location and/or network location such as IP address), the attached peripheral devices and the like. Based on the client profile information, the Meta-Desktop module 220 generates a Meta-desktop session using an appropriate Meta-desktop server 225 (e.g., one having spare capacity) and establishes a secure device connection with the requesting client device 400 to display the client-specific customized Meta-Desktop on the requesting client device 400. As a security measure, the Meta-Desktop service module 220 preferably initiates the device connection to the client device 400 to ensure that the Meta-Desktop service module 220 is in communication with a valid and authenticated client device 400.

Figures 2A, 2B:
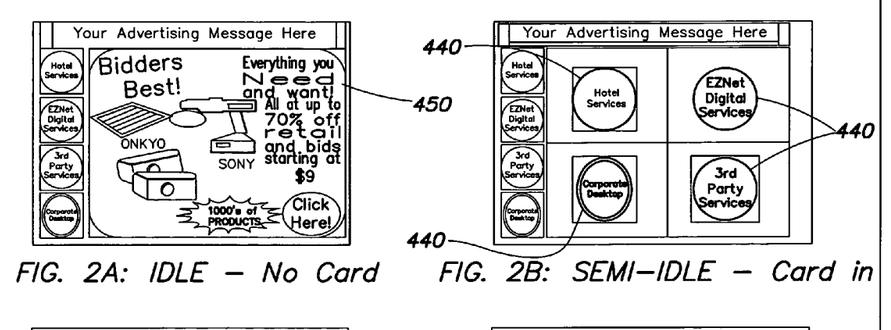
FIGS. 2A-2D are exemplary screen shots of the Meta-Desktop in accordance with an embodiment of the present invention.
Figure 2C:
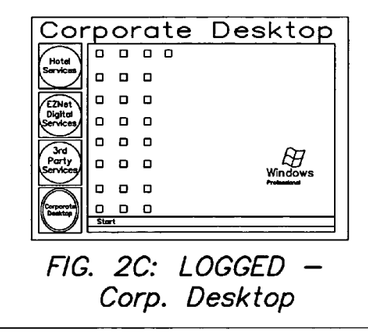
Figure 2D:
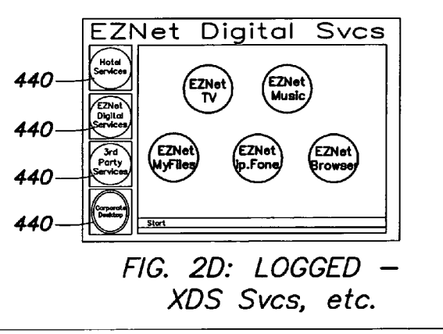

The Meta-Desktop is a top-level selection interface that is used to launch the user into a specific service connection, i.e., connecting the client device 400 to a specific service center 300 to receive a particular digital service. In accordance with an aspect of the present invention, since the Meta-Desktop is the first screen that is displayed to the user by the client device 400, the Meta-Desktop offers an opportunity to provide advertising 450, branding and other service-related functions along with user-customizable features as shown in FIG. 2A. The Meta-Desktop preferably includes icons 440 representing various services available to a specific authenticated user on a specific authenticated client device 400 as shown in FIGS. 2A-2D. For example, even though a user is subscribed to the Internet telephony service, he may not be able to access the telephony service if the client device 400 is not equipped with a microphone. In accordance with an embodiment of the present invention, based on the client profile information and information received from the client device 400, the Meta-Desktop service module 220 can customize or tailor the Meta-Desktop content for a specific client device, a specific user, a specific location of the user, a specific time, etc. Preferably, the Meta-Desktop module 220 transmits, pushes or broadcasts dynamically changing and constantly updated displays to the client devices 400.

Although the service provisioning system architecture 100 has been described herein as providing the Meta-Desktop service, it is appreciated that the Meta-Desktop service is merely one of many services that can provided by the NOC 200. Accordingly, as with the Meta-Desktop service, authentication service module 210 can authenticate, connect and manage any digital service to the client device 400 via a secure device connection. For example, one authentication module 210 can manage digital service A, such as the Meta-Desktop service, and another authentication module 210 can manage digital service B.

When a user selects a particular service from the Meta-Desktop displayed on the client device 400 (e.g., clicking on an icon 440 associated with that particular service) in step 1060, the serving or assigned NOC 200 that is securely connected to the client device 400 determines the service center 300 that is associated with the selected service. The serving NOC 200 uses its secure connection to the connection service module 310 of the desired service center 300 to initiate a new device connection (also referred to herein as the render connection) between a server 330 and the requesting client device 400 in step 1070. The serving NOC 200 manages the session between the server 330 of the connection module 310 and the requesting client device 400 and maintains a record of the session (i.e., current status or state of the session). That is, the serving NOC 200 provides the client profile information of the requesting client device 400 to the connection service module 310 and instructs the connection service module 310 to establish a session with the requesting client device 400 by initiating a device or render connection between the server 330 providing the requested service and the requesting client device 400 over the WAN 110. This approach provides enhanced security by ensuring that the connection service module 310 initiates all outgoing connections to the client devices 400, and no incoming connections to the service center 300 are permitted. That is, no client devices 400 can call into or initiate connections to the service center 300. Also, the NOC 200 terminates or drops its device connection to the client device 400 that was providing the Meta-Desktop. The connection service module 310 translates the input/output commands from the application service into the remote interactive protocol format and manages the connection to the client device 400. That is, the connection service module 310 converts to the format (resolution, color depth, keystrokes, mouse coordinates etc.) appropriate for each given client device 400 for any of the digital services available on the service center 300. It is appreciated that no translation is required by the connection service module 310 if the application supports native remote interactive protocol, e.g. via the X11 virtual device driver software.

After the NOC 200 initiates the establishment of a session between a particular service center 300 and the client device 400, the requesting client device 400 transmits user inputs to the appropriate service center 300 with over the WAN 110 in step 1080. Upon receipt, the service center 300 processes the inputs and/or performs the computations to generate output/results in step 1090. The service center 300 transmits the rendering commands to the client device 400 in step 1100.

In accordance with an embodiment of the present invention, each NOC 200 is operable to manage multiple sessions with a variety of client devices 400. NOC 200 dynamically updates the display format of each Meta-Desktop based on the type of client device 400 that is currently being used by the user to access the digital service from the service provisioning system architecture 100.

Service provisioning system architecture 100 enhances security by maintaining a secure (e.g., TCP-based) connection between the client device 400 and one of the NOCs 200. The lifetime of the authentication performed on initial user token insertion, i.e., inserting the smart card into the client device 400 to access the digital service, corresponds to the lifetime of the connection that is established between the client device 400 and the NOC 200. As long as this connection is maintained, the NOC 200 sends a "keep-alive" message to the connection service module 310 of the service center 300. Preferably, as an additional security precaution, the connection service module 310 terminates the device connection to the client device 400 if the connection service module 310 fails to receive the "keep-alive" message within a predetermined period of time. It is appreciated that the "keep-alive" function is part of the remote interactive protocol.

As part of the authentication handshake or process, the authentication service module 210 performs a public key transaction to ensure the authenticity of both individual users and the specific client device 400. However, a secure distribution of the keys is a problem in a public key system, thereby a secure system is necessary to ensure that keys are securely distributed and safeguarded. In accordance with an embodiment of the present invention, the service provisioning system architecture 100 utilizes a token-based security system that employs smart card technology for distributing keys and generating session keys. For example, a valid user can use his smart card or integrated circuit card to logon to his session via the client device 400 and access the various Meta-Desktop or digital services. In accordance with an aspect of the present invention, the smart card/token stores user's private key, user credentials (e.g., a client/user ID), the public key of a NOC 200, a uniform resource identifier or locator (URI or URL) that can be used to locate an appropriate NOC (e.g., the string "xtp://<uid>.xds.com/")-, and the like. Preferably, the smart card includes a source of appropriate pseudo-random numbers, so the service provisioning system architecture 100 does not have to rely on the client devices 400 having these capabilities. As discussed herein, the client devices 400 may span a wide range of device capabilities from a simple I/O device to a fully-functional PC.

In accordance with an embodiment of the present invention, the smart card/token can be used to authenticate both the client device 400 and the user. Preferably, smart card is a type used by the global system for mobile communication-subscriber identity module (GSM-SIM). For additional security, in accordance with an aspect of the present invention, authentication service module 210 requires the user to enter a PIN or password to unlock the smart card, similar to the conventional automatic teller machine (ATM) card. This helps prevent the smart card from being used an unauthorized user.

For software-based client device 400 such as a web browser (i.e., one without a smart card reader), the inventive service provisioning system architecture 100 may utilize some other authentication/validation method, such as using secure sockets layer (SSL) for privacy and a fingerprint reader, a password or challenge/response system for authentication.

A digital service such as a word processor application, web browser, video service, telephony connection, etc., can be connected to the WAN 110 through the connector(s) or connection service module(s) 310. Once a session has been established between service center 300 and the client device 400, connection service module 310 of service center 300 activates the requested digital service and converts the incoming digital data representation (e.g., a Windows desktop, display/mouse and keystrokes) into a data representation compatible with the remote interactive desktop protocol format and encapsulates it with the user session ID. That is, the connection service module 310 may generate bit-mapped pixel images of the service output, such as generating virtual image of the desktop, an application, etc. The connection service module 310 also reports its state and availability to the NOC 200. However, if the user or user session does not request a digital service, the NOC 200 or the Meta-Desktop service module 220 merely maintains the session alive and idle, as shown in FIG. 2A. This enables NOC 200 to provide substantially immediate response to a user request for a digital service and to fully maintain the state of the service session at all times.

Figure 4:
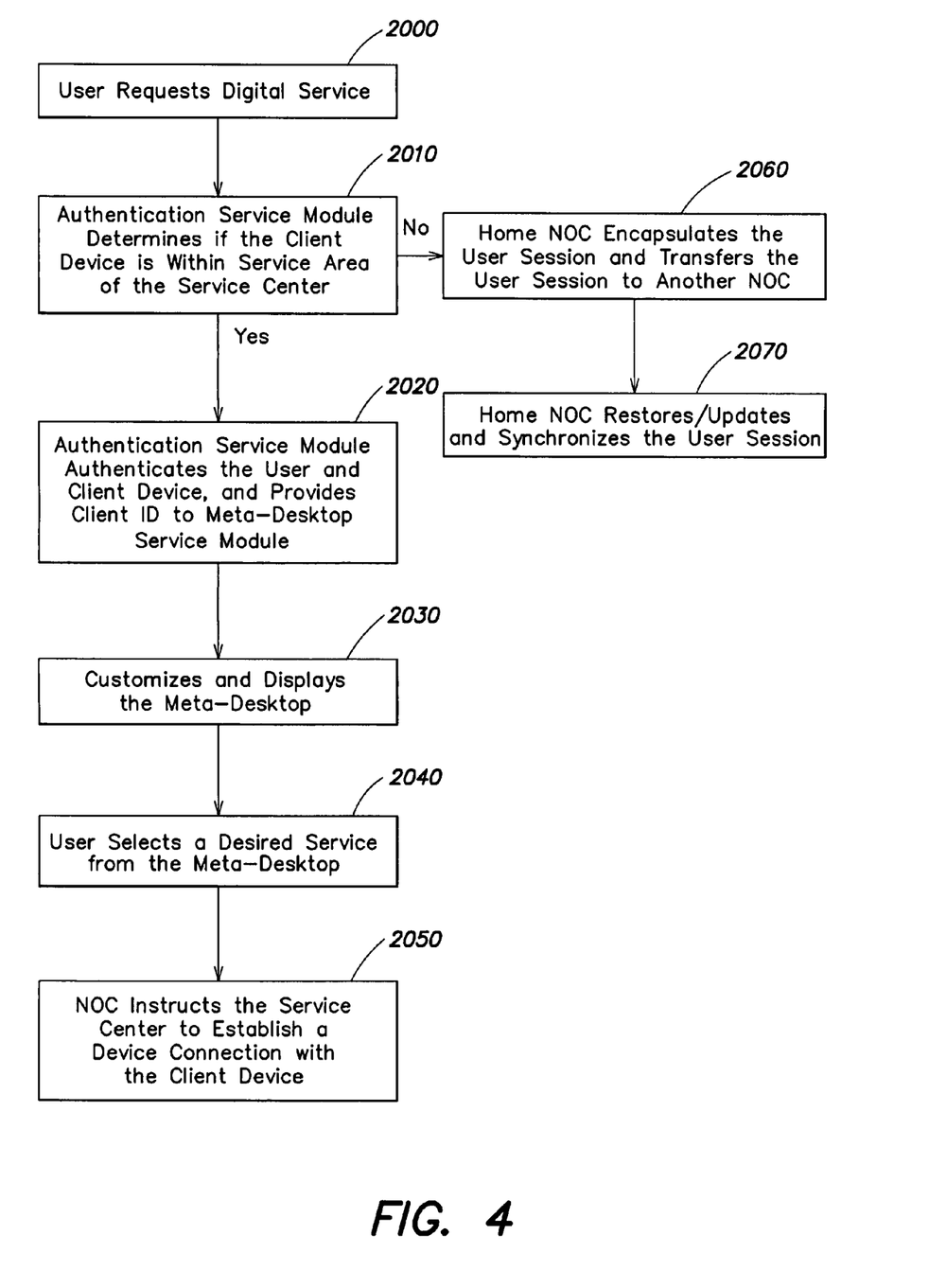
FIG. 4 is a flow chart of a process for transferring control of a client device to another NOC in accordance with an embodiment of the present invention.

Turning now to FIG. 4, there is illustrated a process for transferring control of a client device 400 to another NOC 200 in accordance with an embodiment of the present invention. Upon a user request for digital service (e.g., insertion of the smart card in a client device 400) in step 2000, authentication service module 210 of the NOC 200 determines the geographic and/or network location of the requesting client device 400 (e.g., IP address) and establishes whether the distance between the client device 400 and the service center 300 associated with the digital service (i.e., the serving service center 300) is within the direct service area of the service center, e.g., few thousand miles in step 2010. The authentication service module 210 searches the client database 240 for client profile information which contains information relating to the client device type, attached peripheral devices, location, etc. The size of the direct service area depends on the round-trip delay or response time, which should be preferably below the user's threshold of perception. If authentication service module 210 determines that the requesting client device 400 is within the direct service area of the serving service center 300, the authentication service module 210 authenticates the user and the client device 400, and provides the client ID associated with the requesting client associated with the requesting client device 400 to the Meta-Desktop service module 220 of the NOC 200 in step 2020. The Meta-Desktop service module 220 establishes a device connection with requesting client device 400, customizes the Meta-Desktop based on the client profile information of the requesting client device 400, and displays the customized Meta-Desktop on the requesting client device 400 in step 2030. When the user selects a desired service from the Meta-Desktop displayed on the requesting client device 400 in step 2040, the NOC 200 determines and instructs the corresponding service center 300 to establish a device connection or session with the requesting client device 400 in step 2050.

If the client device 400 is outside the direct service area of the service center 300, in accordance with an embodiment of the present invention, the home NOC 200 encapsulates the user session and transfers and re-establishes the user session to another NOC 200 located closer to the client device 400 (i.e., remote NOC 200) in step 2060. That is, the original user session with the home NOC 200 is "frozen" or suspended. In accordance with an aspect of the invention, a series of dedicated servers and software (i.e., session caching servers) encapsulates and transfers the user session to provide global hot desking (i.e., synchronizing the state of user session among various NOCs 200). Upon a user's return to his home service area, the home NOC 200 restores/updates and synchronizes the user session in his home service area (i.e., stores the state of user session on the user database 230 of the home NOC 200) in step 2070.

The NOC 200 hosts and continuously maintains the user session, thereby enabling the user to freely switch between different types of client devices 400 and/or locations in real time, while maintaining the user session on the NOC 200 and/or the connection service module 210. The user can continue with the session from the point that session was last accessed. Accordingly, if connection service module 210 does not receive the "keep-alive" message from NOC within a predetermined period of time, the connection service module 210 terminates the render or device connection to the client device 400. Similarly, if the user logs off or removes the token or smart card from the client device 400, NOC 200 continuously maintains the user session, but terminates the authentication connection to the client device 400 and instructs the connection service module 210 to terminate its render or device connection to the client device 400. A user can re-enter his user session merely by logging back in. If using a smart card or token, this is done by re-entering the token into the same or different client device 400. Thus, the logging on and logging off can be completed to switch between client devices 400. Thus, a user connected to one client device 400 and showing a presentation could log-off from it and log-on to another client device 400 by removing a token from the first client device 400 and inserting into the second client device 400. Other than a pause in the time needed to switch between the client devices the state of the presentation is maintained and the user can then move about while continuing to show the presentation. When there is a lag time between the time that a user logs off and logs back onto a session, the session would be cached and stored on the connection service module 310 or the NOC 200 while the NOC 200 re-establishes the authenticated and properly configured connection with the new client device. Hence, there is no need for a laptop or proprietary personal digital assistants (PDAs), while traveling, although they can still be used. With the service provisioning system architecture 100, user only needs to carry his smart card or token to remotely access his corporate network from anywhere.

The connection service module 310 receives incoming data from service providers or servers 330 and parses the information for transmission to the client devices 400. The present invention utilizes the basic user interface of each client device 400 rather than transcoding information based on the features and functionalities of each client device 400 to display the representation of the data on the client device 400. Transcoding is a process of converting a media file or object from one format to another. For example, transcoding is used to convert video formats and to fit hypertext markup language (HTML) files and graphic files to the constraints of mobile device and other web-enabled products which usually have smaller screen sizes, lower memory, and slower bandwidth rates. The client session and computing overhead to process and manage each user session resides with the NOC 200.

The connection service module 310 transfers (i.e., uploads and downloads) data to each client device 400. In accordance with an embodiment of the present invention, the connection service module 310 is a normalized virtual media buffer operable to transfer data using a range of protocols, such as ALP, RDP, IP and the like. Preferably, connection service module 310 transfers data using the remote interactive protocol optimized to provide a high level of performance with encrypted delivery of streaming data representations, such as streaming video and audio. Those skilled in the art will appreciate that information relating to streaming audio or video can be transmitted using the User Datagram Protocol (UDP) and/or a proprietary tunneling protocol architecture, as these formats tolerate some data loss while reducing data latency. Each session's graphical user interface (GUI) and visual information can be driven by each service driver having it's own rendering engine or windowing engine, such as Microsoft Windows® or the Java™ virtual machine.

By virtue of the present service provisioning system architecture, NOC 200 can establish a secure communication path between the connection service module 300 and the client device 400 to provide unparalleled levels of security to both the service providers and the users. In addition, the present invention enables all sessions to be available to the user without any data traveling outside the service center 300, thus providing secure and continuous access to the data from anywhere, including unsecured remote locations.

In view of the foregoing description, numerous modifications and alternative embodiments of the invention will be apparent to those skilled in the art. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

The invention claimed is:

1. A method for providing a secure remote access to digital services over a communications network, comprising the steps of:

connecting each of a plurality of service centers to a respective connector to provide one or more digital services over said communications network, each respective connector configured to transform data stored by the service centers in a first format to a set of rendering commands capable of instructing client device connected to the respective service center how to render information on the client device;

receiving a request for a digital service available on a service center from a user on the client device over said communications network;

authenticating said user and said client device by a network operation center;

establishing a device connection between one of the plurality of service centers and said client device to establish a session if said user and said client device are authenticated as a valid user and a valid client device; and in response to the client device requesting data from the one of the plurality of service centers, translating the requested data by said connector to an associated set of rendering commands such that the data in the first format is not transferred over the communications network or stored by the client device.

2. The method of claim 1, wherein the step of translating comprises the step of providing information to generate a human-perceptible presentation on said valid client device.

3. The method of claim 2, wherein the step of providing information provides screen image data for display by said valid client device.

4. The method of claim 2, wherein the step of providing information provides bit-mapped image data.

5. The method of claim 1, further comprising the step of displaying of virtual representation of data on said valid client device to ensure that said data is not transmitted outside of respective service center, thereby providing a secure remote access to digital services.

6. The method of claim 1, further comprising the step of establishing and managing an authentication connection between a client device and said network operation center.

7. The method of claim 6, further comprising the steps of distributing keys using a token-based security system and generating session keys using smart cards.

8. The method of claim 6, further comprising the steps of generating client-specific customized Meta-Desktop displaying digital services available to said valid user and said valid device and receiving a request for a selected digital service from said valid client device.

9. The method of claim 8, wherein the step of generating includes the step of generating said specific customized Meta-Desktop based on profile information of said valid client device.

10. The method of claim 8, further comprising the step of determining a service center associated with said selected digital service to provide a serving service center and controlling said serving service center to establish said session with said valid client device.

11. The method of claim 1, further comprising converting a protocol of a non-compliant device to said remote interactive protocol by a proxy device.

12. The method of claim 1, further comprising the step of providing a predetermined level of quality of service guarantee to ensure a predetermined timely response time by said communications network.

13. The method of claim 1, further comprising the step of continuously maintaining said session regardless of the status of said valid client device.

14. The method of claim 1, further comprising the step of providing a secure remote access to a service selected from the group consisting of: video conference, IP telephony, voice messaging, digital music, digital movie, e-commerce, and computing services.

* * * * *

UNITED STATES PATENT AND TRADEMARK OFFICE
CERTIFICATE OF CORRECTION

PATENT NO. : 7,783,701 B2
APPLICATION NO. : 11/986118
DATED : August 24, 2010
INVENTOR(S) : Mario Dal Canto et al.

It is certified that error appears in the above-identified patent and that said Letters Patent is hereby corrected as shown below:

In the Claims:

At column 17, Claim 1, line 6, please change "commands capable of instructing client device" to -- commands capable of instructing a client device --.

Signed and Sealed this

Twelfth Day of October, 2010

David J. Kappos
*Director of the United States Patent and Trademark Office*